Dec. 3, 1963 T. J. BLOCHER, JR 3,113,295

DATA HANDLING SYSTEM

Filed March 3, 1960 4 Sheets-Sheet 3

INVENTOR.
Thomas J. Blocher Jr.
BY W. L. Stout.
HIS ATTORNEY

United States Patent Office 3,113,295

Patented Dec. 3, 1963

3,113,295

DATA HANDLING SYSTEM

Thomas J. Blocher, Jr., Monroeville, Pa., assignor to Westinghouse Air Brake Company, Wilmerding, Pa., a corporation of Pennsylvania Filed Mar. 3, 1960, Ser. No. 12,549
6 Claims. (Cl. 340—172.5)

My invention relates to a data handling system and more particularly to an improved data handling system for binary digital information.

It is a principal object of my invention to provide a data handling system which accepts pulse data in serial sequence, performs a counting operation, transfers the data in parallel form and stores the data, and reads out the data in a serial sequence.

In the attainment of the foregoing objects I provide a data handling system including a plurality of data handling banks, each bank having a plurality of data handling stages or registers. The input information is counted in the first bank, and transferred in parallel form from the first or counting bank through one or more storage banks to a last or readout bank. The last bank in the system serves the dual function of storing data and providing readout of the data in serial form.

Other objects and advantages of my invention will become apparent from the following description taken in connection with the accompanying drawings in which.

Figure 1:
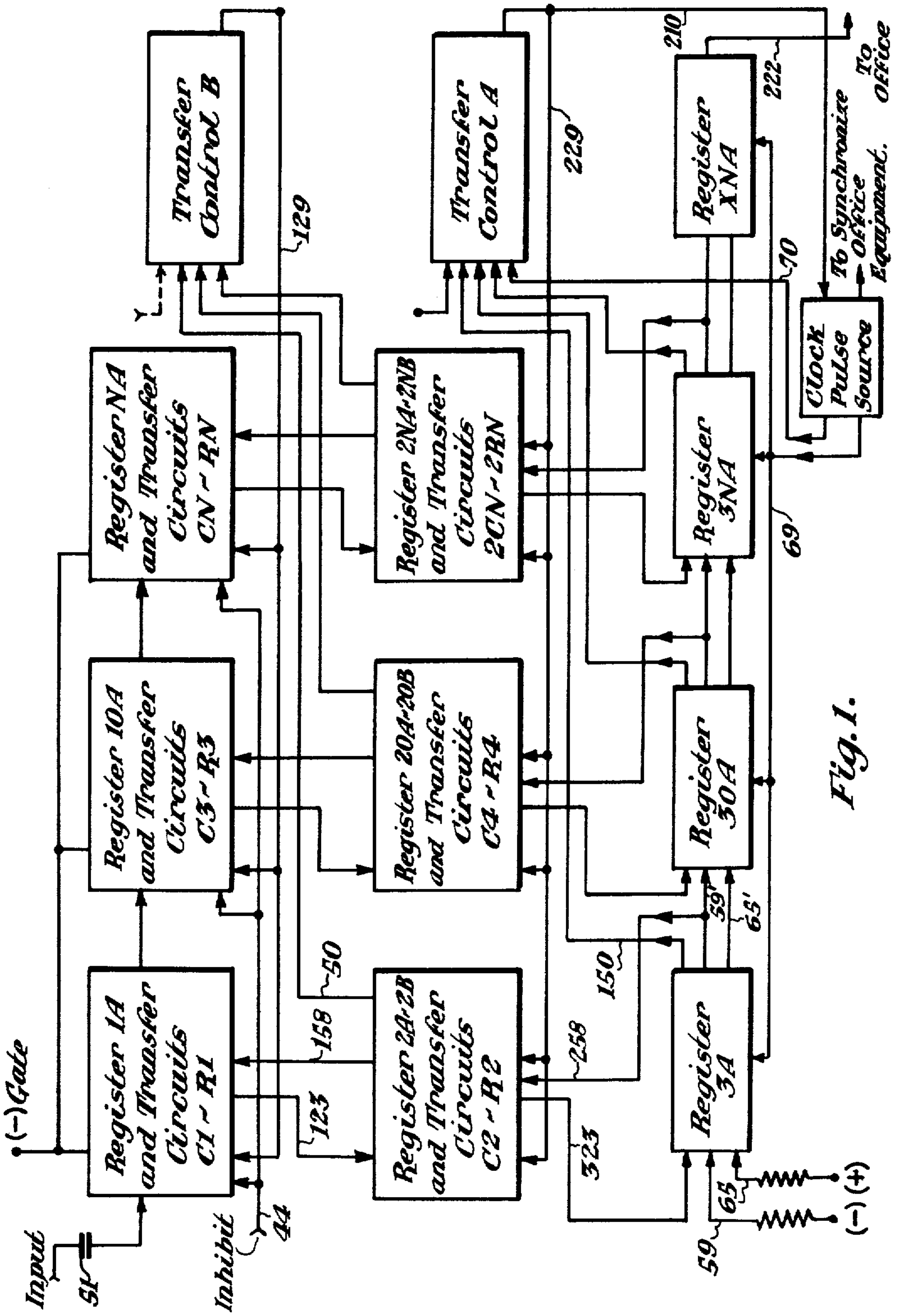
FIG. 1 shows a simplified block diagram of my data handling system.
Figure 1B:
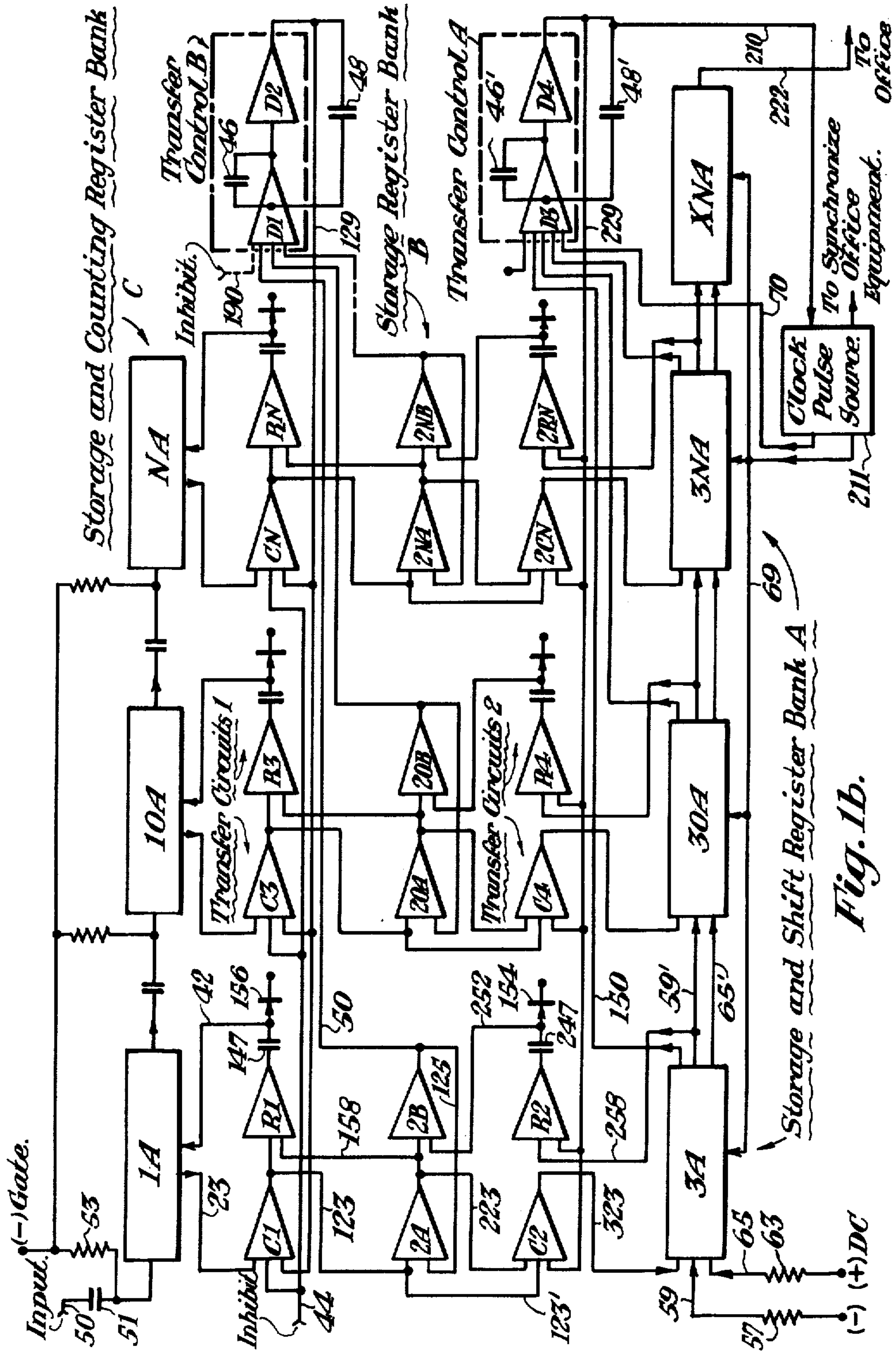
FIG. 1*b* shows a more detailed block diagram of my data handling system.
Figure 2:
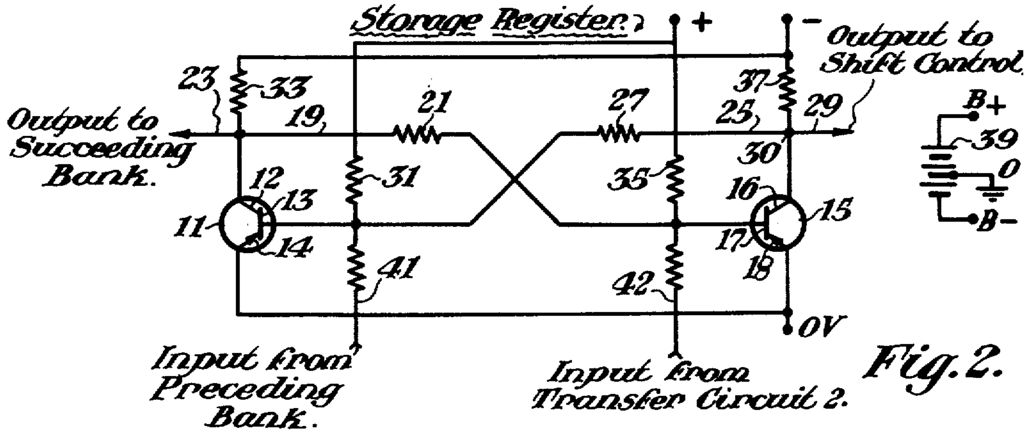
FIG. 2 shows a basic transistor circuit used in the data handling system of FIGS. 1 and 1*b*.
Figure 3:
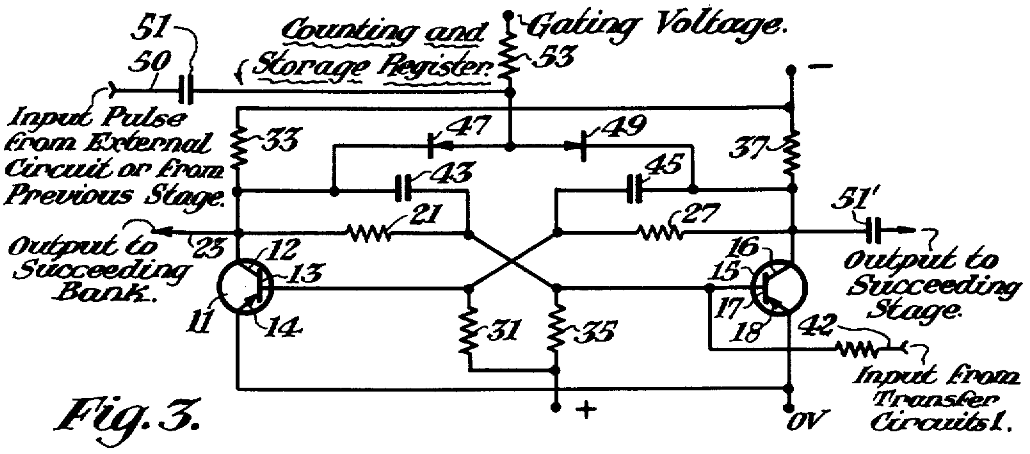
Figure 6:
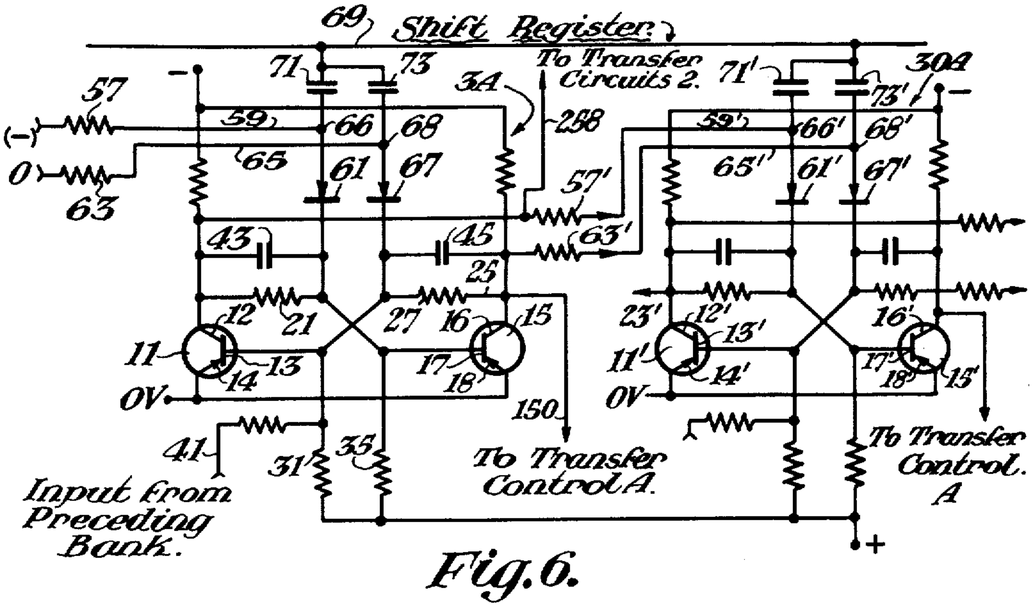
Figure 4:
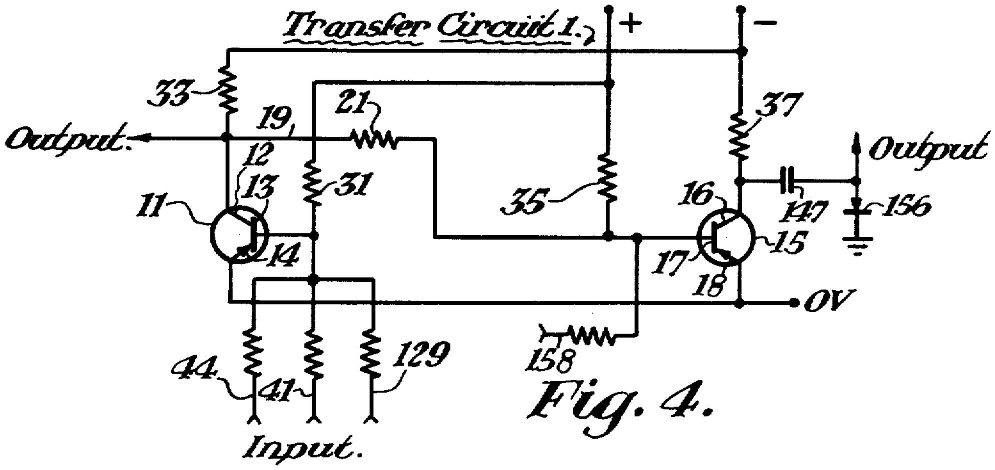
Figures 2A, 5:
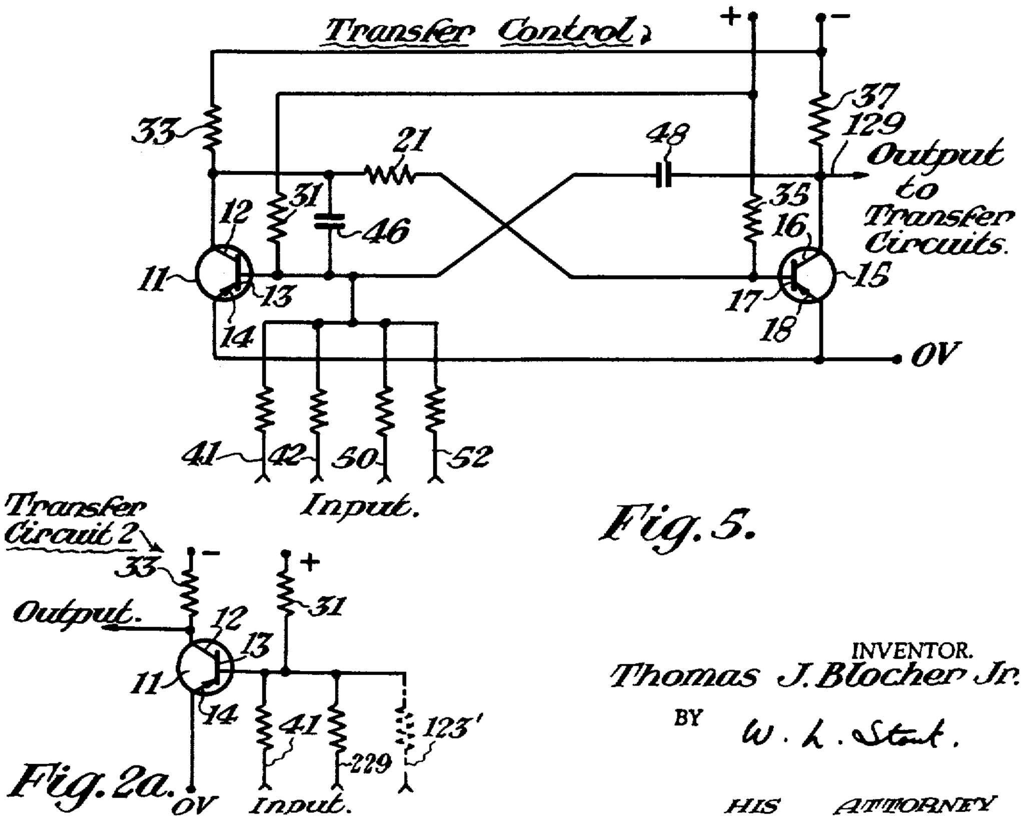

FIG. 2*a* shows a portion of the transistor circuit of FIG. 2 used as a transfer circuit in the system of FIGS. 1 and 1*b*;

FIG. 3 shows a counting circuit used in the system of FIGS. 1 and 1*b*;

FIG. 4 shows a transfer circuit used in the system of FIGS. 1 and 1*b*;

FIG. 5 shows a control circuit including a delay network used in the system of FIGS. 1 and 1*b*; and FIG. 6 shows a shift register circuit used in the system of FIGS. 1 and 1*b*;

One embodiment of my data handling system is shown in block diagram form in FIGS. 1 and 1*b*. Before explaining the structure and operation of the overall data handling system, various individual circuits shown in FIGS. 2–6, of which the system is comprised, will be described.

FIG. 2 shows a bistable multivibrator circuit used as a storage register in the system of FIGS. 1 and 1*b*. The circuit of FIG. 2 is used in the circuits indicated by the block triangles 2A—2B, 20—20B and 2NA—2NB of storage bank B in FIG. 1*b*. FIG. 2 comprises a pair of cross-connected transistors 11 and 15, each transistor having a base, emitter and collector electrode. Collector 12 of transistor 11 is connected through lead 19 and a resistor 21 to the base 17 of transistor 15. Collector 16 of transistor 15 is cross-connected through lead 25 and a resistor 27 to the base 13 of transistor 11. An output is coupled from collectors 12 and 16 through respective leads 23 and 29 for purposes explained below. The biasing potentials for transistors 11 and 15 are obtained from a battery 39 shown to the right of FIG. 2. Battery 39 has a tap connected to ground reference. Transistor 11 is biased as follows: Base 13 is connected through resistor 31 to the positive or B+ terminal and emitter 14 is connected to ground or zero potential, and collector 12 is connected through resistor 33 to the negative or B— terminal of battery 39. Transistor 15 is biased as follows: Base 17 is connected through resistor 35 to the B+ terminal, emitter 18 is connected to ground and collector 16 is connected through resistor 37 to the B— terminal.

Referring to FIG. 2*a* (drawn on the sheet with FIGS. 4 and 5) which, as can be appreciated, is one-half of the circuit of FIG. 2, transistor 11 is biased to be normally nonconducting such that the impedance between the collector 12 and emitter 14 is extremely high and the battery 39 sees transistor 11 essentially as an open circuit so that the output at collector 12 is at the negative potential of the battery (with no load connected to collector 12). When the input voltage connected through a lead 41 to the base 13 of transistor 11 is negative, transistor 11 switches or shifts from a nonconducting condition to a condition in which it is conducting heavily or saturated. When transistor 11 is conducting heavily, the impedance between collector 12 and emitter 14 is very low so that the collector 12 is essentially connected to ground or zero potential. Thus, a negative voltage is obtained as an output from transistor 11 when a zero input signal (no signal) is coupled to its base 13 and conversely a zero voltage or no output is obtained from transistor 11 when a negative signal is coupled to base 13. The transistor stage of FIG. 2*a* is used as transfer circuits 2 comprising block triangles C2, R2, C4, R4, 2CN and 2RN.

Referring again to FIG. 2, transistor 15 as the other half of the bistable multivibrator circuit will function identically to transistor 11 and is in a nonconducting condition when transistor 11 is conducting, and is conducting when transistor 11 is nonconducting, as will be readily apparent. As noted, a negative input signal to base 13 of transistor 11 will cause a zero output from the collector 12 of transistor 11 which output is also connected through lead 19 and resistor 21 to the base 17 of transistor 15 and causes transistor 15 to cut off. This in turn produces a negative output signal at collector 16 of transistor 15 which is cross-connected through lead 25 and resistor 27 to the base 13 of transistor 11 to provide a bistable circuit. Thus, the feedback provided by the cross-connection maintains the multivibrator in a second conducting condition to which it has been shifted as a result of the negative input voltage to the base 13 and thereby stores binary data. A second input to the multivibrator may be connected through lead 42 to base 17 of transistor 15 for purposes to be explained below.

In the storage registers in the system of FIGS. 1 and 1*b*, transistor 11 conducting and transistor 15 nonconducting or cut off indicates the storage of a binary one (1); and conversely, transistor 11 nonconducting and transistor 15 conducting indicates the storage of a binary zero (0).

The circuit of FIG. 3 is similar to that of FIG. 2 with various components added thereto for providing a circuit which provides a counting operation as well as a storage function. Like reference characters in FIGS. 2 and 3 refer to like elements. The counting and storage register of FIG. 3 is used as the circuits indicated by the blocks 1A, 10A and NA of storage bank C in FIG. 1*b*. The additional components in FIG. 3 include: capacitors 43 and 45 which are connected in parallel with resistors 21 and 27, respectively, a diode 47 which has its cathode connected to the collector 12 of transistor 11 and its anode connected to an input capacitor 51, a second diode 49 which has its cathode connected to the collector 16 of transistor 15 and its anode connected to the input capacitor 51, and a resistor 53 connected to the junction of the two diodes.

Due to the cross connections from the collector 12 of transistor 11 to the base 17 of transistor 15 and of the collector 16 of transistor 15 to the base 13 of transistor 11, relatively positive input pulses on lead 50 are coupled through capacitor 51, diode 47 and capacitor 43 to the base 17 of transistor 15, or through diode 49 and capacitor 45 to the base 13 of transistor 11 depending on which transistor is conducting. The purpose of resistor 53 is explained below. In operation, the collector of the nonconducting transistor is at a more negative potential than the collector of the conducting transistor, and the respective diode is thus forward biased to provide a low impedance to positive input pulses while the potential on the cathode of the diode connected to the conducting transistor is at essentially 0 volts potential and is effectively a high resistance to any positive input pulses. An input pulse coupled through capacitor 51 is thus routed by the diodes to the base of the conducting transistor through the conducting diode but is blocked from appearing at the base of the nonconducting transistor by the diode which is cut off. For example, assume transistor 11 is conducting and transistor 15 is cut off. A positive pulse will be routed through diode 49, and capacitor 45 to the base 13 of transistor 11 to cut off transistor 11. Conversely when transistor 15 is conducting and transistor 11 is cut off a positive pulse will be routed through diode 47 and capacitor 43 to base 17 to cut off transistor 15. At this point, it should be noted that the input pulses coupled to capacitor 51 to the transistor need only be relatively positive to the negative potential of the battery and may actually be at zero potential.

During the switching operation the capacitors 43 and 45 momentarily increase the gain of the loop traced from collector 16, base 13, collector 12, base 17, and back to collector 16. Capacitors 43 and 45 are relatively small, since large capacitors would tend to slow down the repetition speed of operation of the circuit.

A circuit utilized in transferring data between storage banks C and B is shown in FIG. 4. The circuits of FIGS. 2 and 4 are similar and like reference characters in the two figures refer to like elements. The circuit of FIG. 4 is used as transfer circuit 1 comprising block triangles C1—R1, C3—R3 and CN—RN in FIG. 1*b*. As can be seen from FIG. 4, the connection from the collector 16 of transistor 15 to the base 13 of transistor 11 as shown in FIG. 2 is eliminated and it is the input voltage present at the base 13 of transistor 11 which determines the conducting condition of the transistor 11. A negative voltage connected through any of leads 41, 44 or 129 will cause transistor 11 to conduct; likewise, a zero voltage on all of the leads 41, 44, and 129 will cause transistor 11 to cut off. The conducting condition of transistor 15 is determined by the voltage on lead 158 in a similar manner.

The details of the transfer control circuits which control the operation of the transfer circuits are shown in FIG. 5. The circuits of FIGS. 2 and 5 are similar and like reference characters in the two figures refer to like elements. The circuit of FIG. 5 is used as transfer control circuits A and B comprising block triangles D1—D2, and D3—D4 in FIG. 1*b*. In FIG. 5, two capacitors 46 and 48 have been added to the circuit shown in FIG. 2 to introduce a delay in the circuit; and, resistor 27 has been removed.

The operation of the circuit is as follows: Normally the inputs 41, 42, 50 and 52 to transistor 11 in FIG. 5 are at zero volts potential so that transistor 11 is nonconducting. When one or more of the inputs to transistor 11 become negative, transistor 11 tries to conduct, however transistor 11 can conduct only the slightest amount before capacitor 46 starts to discharge. The discharging of capacitor 46 tends to maintain transistor 11 cut off. Transistor 11 gradually conducts more and more as capacitor 46 discharges until transistor 15 starts to cut off. When the collector of transistor 15 starts to go negative, capacitor 48 provides feedback energy to transistor 11 that opposes the action of capacitor 46. Now transistor 11 turns on very quickly and cuts off transistor 15. When all the negative inputs to transistor 11 become zero volts the action reverses. The reasons for requiring a time delay in transfer control circuits A and B are explained more fully hereinbelow.

In applicant's data handling system it is desired to read out the data stored therein in a serial manner. Therefore, the last storage bank in the system provides the multiple function of receiving data from a previous storage bank in parallel manner, storing the data, and then shifting or reading out the data in a serial manner. The storage and shift registers utilized are shown in FIG. 6 and are similar to the circuits of FIGS. 2 and 3. Like reference characters in FIGS. 2, 3 and 6 refer to like elements. The shift registers of FIG. 6 are used as the circuit indicated by the blocks 3A, 30A, 3NA and XNA of storage bank A in FIGS. 1 and 1*b*. FIGURE 6 shows two identical registers 3A and 30A to simplify the description of the operation of circuits. The components of register 30A have been designated with a prime to distinguish over the components of register 3A to aid in the explanation of the circuits.

In FIG. 6, the base 13 of transistor 11 is connected through a diode 67 and a capacitor 73 in series to a shift bus or lead 69. Diode 67 is poled to have its anode connected to capacitor 73 and its cathode connected to base 13. Similarly base 17 of transistor 15 is connected through diode 61 and a capacitor 71 in series to bus 69. The diode 61 is poled to have its anode connected to capacitor 71 and its cathode connected to base 17. A resistor 57 is connected by an input lead 59 to the junction 66 of capacitor 71 and diode 61; likewise, a resistor 63 is connected by lead 65 to the junction 68 of capacitor 73 and diode 67.

In register 3A, which is the first register in storage bank A, viewing FIGS. 1 and 1*b*, a negative direct current voltage is coupled through resistor 57, lead 59, to diode 61; and zero volts, i.e. a relatively more positive direct current voltage is coupled through resistor 63, lead 65 to diode 67. In the case of the other registers in storage bank A, the voltage at the collectors of the two transistors in a preceding register is cross-coupled to the junction corresponding to 66 and 68 in the succeeding register. For example, the voltage at collector 12 of transistor 11 in register 3A is coupled through resistor 57', lead 59' to junction 66' in register 30A; and the voltage at collector 16 of transistor 15 in register 3A is coupled through resistor 63', lead 65' to junction 68' in register 30A. Obviously, the voltages coupled to junction points 66' and 68' are effectively opposite in polarity, more specifically one of the voltages is at zero while the other is at negative potential.

As explained more fully below, positive shift pulses are applied to bus or lead 69 from a source of clock pulses 211. Diodes 61' and 67' act as gates which are controlled by the voltages connected from the preceding register to points 66' and 68'; when diode 61' is biased to have a low forward impedance diode 67' is biased to have a high forward impedance and vice versa. Consequently, the shift pulses are routed to one or the other of the two transistors 11' and 15' depending on the state of conduction of the preceding register.

Assume a binary 1 is stored in register 3A (transistor 11 is conducting and transistor 15 is nonconducting) and a binary 0 is stored in register 30A (transistor 11' nonconducting and transistor 15' conducting). Assume a shift pulse is now coupled through bus 69 to the registers in storage bank A; for simplicity consider only storage registers 3A and 30A shown in FIG. 6. The negative voltage at junction 66 will cancel the effect of the positive shift pulse. However, a positive shift pulse will couple through capacitor 73, junction 68 and diode 67 to base 13 and cut off transistor 11. Transistor 15 will then start conducting. Thus the binary 1 stored in storage register 3A will be cancelled. In register 30A, diode 61′ will pass the shift pulse to base 13′ of transistor 11′ while the negative potential on the anode of diode 67′ tends to cancel the effect of the shift pulse. Consequently, transistor 15′ will be cut off and transistor 11′ will begin to conduct. Thus storage register 30A will store a binary 1 therein.

Resistor 57′ in combination with capacitor 71′, and resistor 63′, in combination with capacitor 73′, provide memory or RC delay circuits for purposes to be explained hereinbelow.

The number of storage banks as well as the number of storage registers in each of the storage banks is essentially unlimited. However, for simplicity in explanation, only three banks A, B and C are shown; three registers are shown in banks B and C and four registers are shown in bank A. As is known, the three registers in storage bank C can count and store from 1 to 7 pulses and count to the decimal numeral 7 as indicated in the following table. The binary bits in the following table are in the same order as the position of the storage banks in FIG. 1 to which they refer.

TABLE I

| Decimal numeral: | Binary designation |
|---|---|
| 0 | 000 |
| 1 | 100 |
| 2 | 010 |
| 3 | 110 |
| 4 | 001 |
| 5 | 101 |
| 6 | 011 |
| 7 | 111 |

The operation of my system will now be described. Note again that the details of the blocks in FIGS. 1 and 1*b* are as follows: Registers 1A, 10A and NA are as in FIG. 3; transfer circuits 1, comprising C1—R1, C3—R3 and CN—RN are as in FIG. 4; transfer control circuits A and B are as in FIG. 5; registers 2A—2B, 20A—20B and 2NA—2NB are as in FIG. 2; transfer circuits 2, comprising C2, R2; C4, R4; and 2CN, 2RN are as in FIG. 2*a*; and shift registers 3A, 30A, 3NA and XNA are as in FIG. 6.

Refer now to FIGS. 1, 1*b* and 3. As noted, the circuit of FIG. 3 in addition to storing binary data, also counts the number of positive input pulses. Initially registers 1A, 10A and NA are each in a similar state of conduction, that is, a binary zero is indicated by each register, and, transistor 11 is cut off and transistor 15 is conducting.

As explained above, a positive input pulse coupled to storage register 1A through lead 50 and capacitor 51 is routed through diode 47 and capacitor 43 to the base 17 of transistor 15 to cut off transistor 15 and cause transistor 11 to conduct. The other storage registers remain in their initial condition. This functions to count and store a decimal numeral 1 in storage bank C since the binary code 100 (see Table I) is now entered into storage registers 1A, 10A and NA, respectively.

A negative (−) inhibit voltage is connected from a suitable external circuitry through a lead 44 to each of the first stages C1, C3 and CN of transfer circuits C1—R1, C3—R3 and CN—RN (see also FIG. 4) when the counting operation is being performed in storage bank C to prevent or inhibit data from being transferred from storage bank C to storage bank B. If, however, the inhibit voltage can be applied a sufficient time before the input pulse to allow for the delay introduced by transfer control B, the details of which are shown in FIG. 5, a negative input through lead 190 to D1 will serve the purpose. In FIG. 1*b*, D1 indicates transistor stage 11 in FIG. 5 and D2 indicates transistor stage 15 in FIG. 5. If the inhibit voltage is applied to both leads 44 and 190, the inhibit voltage will be effective immediately, but will not be removed instantaneously, rather it will be delayed in its decay by the delay time of shift control B.

The negative voltage on lead 44 maintains each of C1, C3 and CN in a conducting condition. The negative voltage from 2A connected through lead 158 to R1 maintain R1 conducting. Likewise R3 and RN are maintained in a conducting condition. Regardless of the input from 1A, 10A or NA to each of stages C1, C3 and CN, respectively, transfer circuits C1—R1, C2—R2 and CN—RN will not change their conducting conditions, thus permitting the registers in storage bank C to continue counting.

A second input pulse coupled to register 1A is routed through diode 49 and capacitor 45 to base 13 and causes transistor 11 to cut off and transistor 15 to start conducting. This action cancels the binary (1) one stored in register 1A, but when transistor 15 is saturated, it provides a positive pulse through capacitor 51′ and the associated diodes to register 10A. When register 10A receives a positive pulse it operates in the same manner as explained above for register 1A to store a binary (1) one therein. This action causes a numeral 2 to be counted and stored in storage bank C since a binary code 010 will be stored in registers 1A, 10A and NA, respectively. Likewise, a third pulse will store a binary code of 110 in storage registers 1A, 10A and NA, respectively, corresponding to numeral 3. As indicated above the three registers in storage bank C can count to a total of a decimal numeral 7.

When it is desired to transfer the count from storage bank C to storage bank B, the negative inhibit voltage from the external circuitry is removed from lead 44 and a zero voltage is coupled through lead 44 to C1, C3 and CN. When the inhibit voltage is removed from lead 44 the count stored in storage bank C is transferred in parallel or broad side to storage bank B.

Since the various columns of registers and circuits operate essentially independently of one another when data is being transferred from one bank to the next lower bank, only the operation of the one column of registers, say 1A, 2A—2B, and 3A in FIG. 1*b*, need be described in detail for an understanding of the transfer operation.

Initially, storage registers 1A, 2A, 3A and transfer control circuits B and A are biased to be in a conducting condition or state (0–0); wherein the first symbol designates an input to the base electrode of the first transistor in a circuit, the second symbol designates an output from the first transistor or an input to the second transistor in each circuit, and the third symbol designates an output from the second transistor; that is, the first transistor is nonconducting and the second transistor is conducting.

In the cases of transfer circuits 1 and transfer circuits 2, for example C1—R1 and C2, R2, respectively, the state of each transistor is given separately with the first symbol indicating an input and the second symbol an output of each transistor. A (−) symbol indicates a relatively negative voltage input while a (0) symbol indicates a zero voltage input. Initially, C1 is in state (−0) due to the (−) input to C1 from 1A through lead 23, and R1 is in state (−0) due to the (−) input to R1 from 2A through lead 158. C2 is in a state (−0) due to the (−) input to C2 from 2A through lead 123′, and R2 is in a state (−0) due to the (−) input to R2 from 3A through lead 258, see also FIG. 6.

The transfer of data between banks will now be described. Assume first that a binary (1) one is stored in storage register 1A. External circuits couple zero volts through lead 44 to C1. The various sequential steps in the transfer operation are as follows:

(1) Register 1A is in state (−0−).

(2) The (0) output from 1A through lead 23 to C1 causes C1 in transfer circuit 1 to shift to (0−). R1 remains in state (−0).

(3) The (−) output from C1 connected through lead 123 to stage 2A causes register 2A—2B to shift to (−0−). The (−) output from C1 is also connected through lead 123 and 123′ to C2 to prevent C2 from shifting its conducting condition until 2A registers a binary 1 and transfer control B provides a voltage to reset C1—R1 as explained below. This assures that an orderly sequential transfer operation occurs.

A (0) output from 2A is now connected through lead 158 to R1. However, R1 remains in state (—0) due to the (—) input from C1.

(4) The (—) output from 2B is connected through lead 50 to stage D1 in transfer control circuit B comprising stages D1—D2. With a (—) input, stages D1—D2 shift to (—0—), after a time delay determined by capacitors 46 and 48. The change in output connected from D2 through lead 129 in parallel to C1, C3 and CN is delayed to compensate for any variations in the circuit parameters of the various columns of registers to assure that each of the registers in storage bank C has sufficient time to transfer the data stored therein to the associated registers in storage bank B.

(5) The (—) output from D2 connected through lead 129 to C1, causes circuit C1 to shift to (—0). When C1 shifts to (—0), and since lead 158 is now connecting a zero voltage from 2A to R1, R1 shifts to (0—).

(6) As R1 shifts to (0—), a negative (—) transient voltage or pulse is developed at the output of R1 which pulse is coupled through capacitor 147 and lead 42 to shift, or reset register 1A to its initial condition of (0—0) and clear register 1A of input data.

If register 1A is in state (—0—), that is, binary 1 is stored therein at the completion of the counting operation, and R1 resets 1A to an initial condition (0—0) over lead 42 a pulse would tend to be transferred to 10A. Therefore, a relatively high negative gate voltage is coupled from external circuitry through resistor 53 during the transfer operation such that diodes 47 and 49, see FIG. 3, will remain non-conducting even though a positive pulse might be passed by input capacitor 51. The gate voltage must be of sufficiently high negative amplitude to prevent any positive input voltages from triggering the circuits.

Lead 158 connected as an input to R1 from 2A checks that register 2A—2B has shifted to (—0—). If register 2A—2B does not, for any reason, shift to (—0—), and remains as (0—0), lead 158 connects a (—) voltage from 2A to R1 which in turn will couple a (0) output to 1A. Since a steady state (—) voltage is now connected to R1 neither a (0) nor (—) transient input to R1 will cause a change in the R1 conducting condition. Thus, since R1 cannot shift to its non-conducting state to provide a negative pulse to reset 1A, register 1A cannot transfer out the binary 1 stored therein. By this means a failure in the circuit can be indicated.

(7) The (0) output from C1 connected through lead 123 to 2A causes no change in register 2A—2B since the negative feedback from 2B to 2A through lead 125 maintains register 2A—2B in state (—0—).

(8) The (0) output from 2A connected through lead 223 to C2 and the (0) output from C1 connected through leads 123 and 123′ to C2 causes C2 to shift to (0—). (At this time D4 is providing a (0) input through lead 229 to C2.)

(9) The (—) output from C2 connected through lead 323 to 3A causes register 3A to shift to (—0—). R2 shifts to state (0—) due to the (0) input received from 3A through lead 258 and the (0) input received from D4 through lead 229.

(10) The (—) output pulse developed as R2 shifts to (0—) is coupled through capacitor 247 and lead 252 to 2B to reset register 2A—2B to (0—0) to clear said register of input data. Lead 258 checks that 3A has set to (—0—) in a similar manner as discussed above in connection with lead 158.

(11) The (—) output from 3A connected through lead 150 to a stage D3 in transfer control A causes D3—D4, after a time delay determined by capacitors 46′ and 48′ to shift to (—0—). The proper sequence of transfer operation is based on the fact that transfer control circuits A and B are identical and the delay time changing from (—0—) to (—0—) is shorter than the delay time changing from (0—0) to (0—0). If this were not so, additional data might transfer into storage bank B from storage bank C before the transfer operation from storage bank B to storage bank A is completed, mixing the two numbers.

(12) When 2A—2B shifts to (0—0) the (0) output connected through lead 50 to stages D1—D2 of transfer control circuit B causes D1—D2 to shift to (0—0). A (0) output from D2 is connected through lead 129 to C1.

The (—) input now connected through lead 158 to R1 shifts R1 to (—0). A diode 156 having its anode connected to capacitor 147 and its cathode connected to ground or zero potential permits capacitor 147 to discharge to zero potential when the output of R1 shifts to (0); the capacitor discharge has no effect on register 1A.

(13) The (—) output from D4 connected through lead 229 in parallel to C2 and R2 causes both C2 and R2 to shift back to their initial condition (—0). As can be seen from FIG. 1, the output from D4 is connected through lead 229 in parallel to C2, R2, C4, R4, 2CN and 2RN to maintain the transfer operations between the registers in the various banks synchronized as discussed above for transfer circuits 1 which include C1, R1.

(14) At this point, a (0) zero ouput from C2 connected through lead 323 to 3A causes no change in register 3A, since the (—) feedback from the second transister to the first transistor in register 3A maintains 3A in conducting condition (—0—), that is, stores a binary (1) one in storage bank A.

Assume another group of pulses is counted and stored in storage bank C, and it is next desired to transfer the counts from storage bank C to storage bank B. When the desired count is entered in storage bank C, the inhibit voltage is recoved from transfer circuits 1. Assume again for simplicity that a binary code 100 is entered in registers 1A, 10A, and NA, respectively.

(1) Register 1A is in state (—0—).

(2) The (0) output from 1A connected through lead 23 causes C1 to shift to (0—). R1 remains in state (—0).

(3) The (—) output from C1 connected through lead 123 to 2A causes register 2A—2B to shift to (—0—).

(4) The (0) output from 2A connected through lead 223 to C2 causes no change in transfer circuit C2—R2 since the (—) voltage from D4 connected through lead 229 to C2 and R2 maintains both C2 and R2 in state (—0). As will be appreciated, transfer control A (circuits D3—D4) is in state (—0—) due to the fact that a binary (1) one is stored in register 3A. Transfer control A thus provides a (—) voltage to circuit C2 and R2 to inhibit additional transfer of data to storage bank A. Lead 229 connects the output of D4 in parallel to C2, C4 and 2CN, and thus once a binary (1) one is stored in any of the registers in storage bank A no additional data can be entered into the other registers of storage bank A; and assures that if a binary (1) one is entered into at least one of the registers in a storage bank, a binary (0) zero or no input to one or more of the other registers in the storage bank functions as an intelligible bit of each code.

(5) The (—) output from 2B connected through lead 50 to D1 causes stages D1—D2 to transfer control circuit B to shift to (—0—) after a time delay determined by capacitors 46 and 48.

(6) The (—) output from D2 connected through lead 129 to C1 causes C1 to shift to (—0). R1 shifts to (0—) due to the (0) input from both C1 and 2A.

(7) The (—) pulse developed as R1 shifts to (0—) is coupled through capacitor 147 and lead 42 to register 1A to reset 1A to (0—0) to clear 1A of data.

(8) At this point register 3A in storage bank A and register 2A—2B in storage bank B both have a binary (1) one stored therein.

Assume a third group of pulses are received, counted and stored in storage bank C. Assume yet again for simplicity in explanation that a binary code 100 is entered into storage registers 1A, 10A and NA, respectively. The various operational steps are as follows:

(1) Register 1A is in state (—0—).

(2) The (0) output from 1A connected through lead 23 to C1 causes no change in circuit C1—R1 since the (—) input from D2 maintains C1 in state (—0) and R1 in state (0—). Thus transfer control B provides an inhibit voltage to C1 to prevent additional transfer of data to storage bank B for purposes as described above in connection with transfer control A.

(3) There is no output from R1 through lead 42 to 1A since capacitor 147 blocks any direct current voltage.

(4) At this point, register 3A in storage bank A, 2A—2B in storage bank B, and 1A in storage bank C all have a binary (1) one stored therein.

The readout operation of the storage bank A is as follows:

Assume input data has been transferred through lead 323 to storage register 3A in storage bank A (transistor 11 conducting, transistor 15 nonconducting), see FIG. 6. As discussed above, as soon as data from storage bank B is transferred to any of the storage registers in storage bank A, a negative voltage is coupled from the register having a binary (1) one stored therein to shift control A. As also discussed above, shift control A in turn couples a negative inhibit voltage through lead 229 to each of the transfer circuits C2, R2, C4, R4, 2CN, 2RN to prevent the shifting of any additional data from storage bank B to storage bank A until the readout operation in storage bank A is completed. At the same time, a signal is coupled from shift control A through lead 210 to a source of clock pulses 211 to initiate the series of shift pulses to begin the readout operation. The clock source may be of any well known type as described for example in the Pulse and Digital Circuits by Millman and Taub, published by McGraw-Hill Book Co. Inc., 1956. These shift pulses are coupled in parallel through lead 69 to the storage registers in storage bank A. Clock source 211 also couples an inhibit voltage to shift control A through lead 70 to assure that shift control A continues to provide an inhibit voltage to prevent any shifting of data from storage bank B to storage bank A until the readout operation is completed.

Assume now, for purposes of explanation, that the numeral 1, that is, a binary code 100 has been entered into storage registers 3A, 30A and 3NA, respectively.

Refer now to FIG. 6 as well as FIG. 1*b*. If as assumed for this example, a binary (1) one is stored in register 3A (transistor 11 conducting, transistor 15 nonconducting) a zero voltage will be coupled from the collector 12 of transistor 11 through resistor 57′, lead 59′ to junction 66′ of register 30A, and a negative voltage will be coupled from collector 16 of transistor 15 through resistor 63′, lead 65′ to junction 68′ of register 30A. If as assumed, storage register 30A has a binary (0) zero stored therein, transistor 11′ will be nonconducting and transistor 15′ will be conducting. Thus a negative voltage will be coupled from the collector 12′ of transistor 11′ to the junction in register 3NA corresponding to junction 66′ in register 30A, and zero voltage will be coupled from the collector 16′ of transistor 15′ to the junction in register 3NA corresponding to junction 68′ in register 30A. If as also assumed a binary (0) zero is stored in register 3NA a zero voltage will be coupled from register 3NA to the junction in register XNA corresponding to junction 66 of register 3A and a negative voltage will be coupled from register 3NA to the junction in storage register XNA corresponding to junction 68 in register 3A.

A shift pulse (the shift pulses are positive) connected through lead 69 to the registers in bank A starts the read out operation. The negative direct current voltage connected to junction point 66 in register 3A cancels the effect of the shift pulse. However, the zero voltage connected to junction point 68 in register 3A biases diode 67 to have a low forward impedance and causes diode 67 to pass the first shift pulse to the base 13 of transistor 11 to cut off transistor 11. When transistor 11 is cut off and transistor 15 begins to conduct a negative voltage is coupled through resistor 57′ to junction point 66′ and a zero voltage is coupled through resistor 63′ to point 68′. Resistor 57′ in combination with capacitor 71′, and resistor 63′ in combination with capacitor 73′, provide delay circuits for assuring that the voltage developed at points 66′ and 68′, respectively, as a result of change in the conducting state of register 3A is delayed by a sufficient amount to permit the shift pulse to actuate transistors 11′ and 15′ in register 30A before the new potential representative of the change in the conducting condition of register 3A is effective at points 66′ and 68′. Thus, assuming a binary code of 100 is stored in storage bank A when the first shift pulse is coupled to storage bank A it causes the conducting state of the first storage register 3A to shift and thereby cancel the binary one (1) stored therein.

In the initial assumed condition a zero voltage is coupled from the collector 12 of transistor 11 to junction point 66′ in register 30A and a negative voltage is coupled from the collector 16 of transistor 15 to the point 68′ in register 30A. Also in the initial assumed condition a binary (0) zero is stored in register 30A, that is, transistor 11′ is cut off and transistor 15′ is conducting. The negative voltage coupled from the collector 16 of transistor 15 to point 68′ will cancel the effect of the first shift pulse and no voltage will be coupled to the base 13′ of transistor 11′. However, the zero voltage connected to junction 66′ biases diode 61′ to have a low forward impedance and causes diode 61′ to pass the first shift pulse to the base 17′ of transistor 15′ to cut off transistor 15′ thus causing transistor 11′ to start conducting. In effect a binary (1) one will now be stored in register 30A therein.

As will be appreciated this first shift pulse thus shifts the binary (1) one initially stored in register 3A to storage register 30A. Since the zero and negative voltages coupled from the transistors in register 30A to the transistors in the succeeding register 3NA are applied to transistors which are already respectively conducting and nonconducting the first shift pulse will not affect the operation of registers 3NA. Likewise, the first positive shift pulse will not affect the operation of register XNA.

The second shift pulse will not change the conducting condition of register 3A but will cause storage register 30A to change its conducting condition and thereby cause a binary (1) one stored in register 30A to shift to register 3NA. The third shift pulse will likewise cause a binary (1) one now stored in register 3NA to shift to register XNA.

The voltage appearing at the output lead 222, that is the second transistor, of register XNA evidencing a binary (1) one actuates a device such as a relay to a position to indicate a binary (1) one. Obviously, if a different polarity signal is desired the output could be taken from the first transistor of stage XNA. This information is then transmitted and utilized as desired. The output information may also be taken directly from register 3NA, however XNA provides a desired buffer stage.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. A binary bit data handling system comprising, in combination, a plurality of electronic circuits connected as a plurality of successive data handling banks, means connecting binary data in serial sequence to the first circuit in the first of said banks, the circuits in said first bank being connected in series with each other for serially counting and storing said data, means for progressively transferring data in parallel from the circuits in one bank to the corresponding circuits in the succeeding banks, and means for serially reading out the bits from the series connected circuits of the last succeeding bank.

2. A binary data handling system comprising, in combination, a plurality of electronic circuits connected in rows and columns for forming a plurality of successive data handling banks, means connecting binary input data in serial sequence to the first circuit in the first of said banks, said circuits in the first bank being connected in series with one another for serially counting and storing said input data, transfer means for progressively transferring data in parallel from the circuits in a bank to the corresponding circuits in the succeeding banks, control means energized by a bank having data stored therein for inhibiting transfer of any additional data thereto, and the circuits in the last of said banks being connected in series with one another for storing data and for serially reading out the bits stored therein.

3. A binary data handling system, comprising, in combination, a plurality of electronic circuits connected to form a plurality of successive data handling banks, the first of said banks comprising a plurality of multivibrators connected to count and store said data, means connecting serialized binary input data to said first bank, transfer means for progressively transferring data in parallel from the multivibrators in said first bank to corresponding circuits in the succeeding banks, means for inhibiting the transfer of data from said first bank to the succeeding bank until the counting operation in said first bank is completed, control means energized when data is stored in each of said succeeding banks to inhibit the transfer of additional data thereto, the last of said banks comprising a plurality of multivibrators connected as a shift register, a clock source providing shift pulses in parallel to said multivibrators in said shift register, said last bank thereby providing serial readout of the data stored therein, and means connecting an output from said clock source to inhibit the transfer of data to said last bank until all the data stored therein is read out.

4. A binary data handling system comprising, in combination, a plurality of electronic circuits connected to form a plurality of successive data handling banks, the first of said banks comprising a plurality of circuits connected in series with each other, means connecting binary input data serially to the first circuit in said first bank, said circuits in said first bank counting and storing said input data, transfer means for progressively transferring data in parallel form from the circuits in a bank to the corresponding circuits in the succeeding banks, means for inhibiting the transfer of data from said first bank to the succeeding bank until the counting operation in said first bank is completed, control means energized when data is stored in the banks succeeding said first bank to inhibit the transfer of additional data to the bank having data stored therein, a clock source for providing shift pulses concurrently to all the circuits in the last of said banks, each circuit in said last bank shifting data stored therein to the succeeding circuit in said last bank in response to a shift pulse, said last bank thereby providing serial readout of the data stored therein, and means connecting an output from said clock source to inhibit the transfer of data to said last bank until all the data stored therein is read out.

5. A binary data handling system comprising, in combination, a plurality of electronic circuits connected to form a plurality of successive data handling banks, said banks each including multivibrators having two conducting conditions, the multivibrators in the first and last of said banks being connected in series with each other, means connecting serialized binary input data to the first mulivibrator in said first bank, said multivibrators in said first bank controlling their conducting condition in predetermined order in response to input data for counting and storing said data, means for inhibiting the transfer of data from said first bank to the succeeding banks until the counting operation in said first bank is completed, transfer circuits energized when the input data to said first bank is completed for transferring data in parallel from said multivibrators in said first bank to the corresponding multivibrators in succeeding banks, control circuits energized when data is transferred to each of said succeeding banks to inhibit the transfer of additional data thereto, a clock source for providing shift pulses concurrently to all the multivibrators in said last bank, each of said multivibrators in said last bank controlling its conducting condition in predetermined order in response to a shift pulse to shift data stored therein to the succeeding multivibrator in the same bank for providing a serial readout of the data stored in said last bank, and means connecting an output from said clock source to inhibit the transfer of data from a preceding bank to said last bank until all the data stored in said last bank is read out.

6. A binary data handling system comprising, in combination, a plurality of electronic circuits connected in rows and columns to form a plurality of successive data handling banks, the circuits in the first of said banks comprising multivibrators connected in series with each other to form a counting chain, first means for coupling serialized binary input data to the first multivibrator in said first bank, a plurality of transfer circuits connected to each of said bistable multivibrators, second means for coupling an inhibit signal to said transfer circuits during the time data is being counted in said first bank, the banks intermediate said first and the last of said banks comprising multivibrators connected for operating essentially independently of each other, said transfer circuits initiating the transfer of data in parallel or concurrently from each of said multivibrators in said first bank through the associated transfer circuit to a corresponding multivibrator in the succeeding bank when said inhibit signal is removed, when data is entered therein, each multivibrator in a bank energizing the associated transfer circuit to reset said multivibrators in a preceding bank, gate means energized for preventing the reset operation from entering a count into the multivibrator in said first bank, and control circuit means including a delay network being energized when data is entered into said intermediate and last banks for inhibiting the transfer of additional data thereto until the previously stored data is cleared therefrom, said control circuit means synchronizing the transfer to data between banks, a clock pulse source for providing shift pulses concurrently to all the stages in the last bank of the system, said last bank comprising a plurality of series connected multivibrators arranged to form a shift register, a shift pulse causing each multivibrator in said last bank to shift data stored therein to the succeeding multivibrator in said last bank for providing serial readout of the data stored in said last bank, and means connecting an output from said clock source to inhibit the transfer of data to said last bank until all the data stored therein is read out.

References Cited in the file of this patent

UNITED STATES PATENTS

| | | |
|---|---|---|
| 2,881,412 | Loev | Apr. 7, 1959 |
| 2,945,221 | Hinton et al. | July 12, 1960 |
| 2,951,230 | Cadden | Aug. 30, 1960 |